(12) United States Patent
Dietz

(10) Patent No.: US 7,185,982 B2
(45) Date of Patent: Mar. 6, 2007

(54) MULTIPLE PIECE EYEGLASSES TEMPLE TIP

(75) Inventor: Dan L. Dietz, Houston, TX (US)

(73) Assignee: Gripping Eyewear, Inc., Houston, TX (US)

(*) Notice: Subject to any disclaimer, the term of this patent is extended or adjusted under 35 U.S.C. 154(b) by 0 days.

(21) Appl. No.: 11/101,099

(22) Filed: Apr. 7, 2005

(65) Prior Publication Data

US 2005/0248716 A1 Nov. 10, 2005

Related U.S. Application Data

(60) Provisional application No. 60/567,853, filed on May 4, 2004.

(51) Int. Cl.
*G02C 5/14* (2006.01)

(52) U.S. Cl. .................. 351/123; 351/111; 351/121

(58) Field of Classification Search ............. 351/122, 351/123, 111, 117, 41, 121
See application file for complete search history.

(56) References Cited

U.S. PATENT DOCUMENTS

| | | | |
|---|---|---|---|
| 1,898,059 A | 2/1933 | McDonald | |
| 1,966,717 A | * 7/1934 | Green | ............. 351/123 |
| 1,973,648 A | 9/1934 | Nagel | |
| 3,498,702 A | 3/1970 | Miller | |
| 3,531,188 A | 9/1970 | LeBlanc et al. | |
| 3,565,517 A | 2/1971 | Gitlin et al. | |
| 3,582,192 A | 6/1971 | Gitlin et al. | |
| 3,838,914 A | 10/1974 | Fernandez | |
| 4,050,785 A | 9/1977 | Auge | |
| 4,070,105 A | 1/1978 | Marzouk | |
| 4,196,981 A | 4/1980 | Waldrop | |
| 4,316,654 A | 2/1982 | Allen | |
| 4,496,224 A | 1/1985 | Allen | |
| 4,541,125 A | 9/1985 | Phillips | |
| 4,662,729 A | 5/1987 | Dobson | |
| 4,747,183 A | 5/1988 | Drlik | |
| 4,771,515 A | 9/1988 | Guarro | |
| 4,809,406 A | 3/1989 | Tsai | |
| 4,863,257 A | * 9/1989 | Morgan | ............. 351/123 |
| 4,903,375 A | 2/1990 | DiFranco | |
| 4,946,125 A | 8/1990 | McCarty | |
| 4,949,432 A | 8/1990 | Wisniewski | |

(Continued)

FOREIGN PATENT DOCUMENTS

CN 2510884 9/2002

(Continued)

*Primary Examiner*—Hung Xuan Dang
(74) *Attorney, Agent, or Firm*—Fulbright & Jaworski LLP; Jan K. Simpson

(57) ABSTRACT

A multiple piece temple tip for eyeglasses in which the eyeglasses have a right temple bar and a left temple bar pivotally attached to an eyeglasses frame body. The temple tip includes a temple tip body having a first and second end and a longitudinal channel extending therethrough and at least one temple stop having a longitudinal channel extending therethrough. The temple tip body and stop are formed from a pliable material. The multiple piece temple tip further includes a plurality of rib portions positioned at the second end of the tip body, wherein each rib portion is separated by an area of a reduced diameter of the tip body.

7 Claims, 3 Drawing Sheets

U.S. PATENT DOCUMENTS

| | | |
|---|---|---|
| 5,005,263 A | 4/1991 | Barrett |
| 5,018,242 A | 5/1991 | Guy et al. |
| 5,123,724 A | 6/1992 | Salk |
| 5,235,727 A | 8/1993 | McCloskey |
| 5,328,411 A | 7/1994 | Thornton, II |
| 5,351,098 A | 9/1994 | McDaniels et al. |
| 5,355,184 A | 10/1994 | Varveris et al. |
| 5,372,345 A | 12/1994 | Schmidt |
| 5,389,981 A | 2/1995 | Riach, Jr. |
| 5,408,279 A | 4/1995 | Chiou |
| 5,408,728 A | 4/1995 | Wisniewski |
| 5,414,906 A | 5/1995 | Kren |
| 5,416,537 A | 5/1995 | Sadler |
| 5,491,878 A | 2/1996 | Janouschek |
| 5,568,207 A | 10/1996 | Chao |
| 5,630,258 A | 5/1997 | Schneider |
| 5,682,222 A | 10/1997 | Chao |
| 5,719,655 A | 2/1998 | Peschel et al. |
| 5,737,054 A | 4/1998 | Chao |
| 5,768,716 A | 6/1998 | Porsche |
| 5,786,880 A | 7/1998 | Chao |
| 5,877,838 A | 3/1999 | Chao |
| 5,882,101 A | 3/1999 | Chao |
| 5,883,688 A | 3/1999 | Chao |
| 5,883,689 A | 3/1999 | Chao |
| 5,929,964 A | 7/1999 | Chao |
| 5,936,700 A | 8/1999 | Masunaga |
| 5,940,162 A | 8/1999 | Wong |
| D417,462 S | 12/1999 | Chang |
| 6,012,811 A | 1/2000 | Chao et al. |
| 6,017,120 A | 1/2000 | McCormick |
| 6,027,214 A | 2/2000 | Graham |
| 6,033,068 A | 3/2000 | Spilkin et al. |
| 6,045,221 A | 4/2000 | Resendez, Sr. |
| 6,053,611 A | 4/2000 | Ku |
| 6,092,896 A | 7/2000 | Chao et al. |
| 6,109,747 A | 8/2000 | Chao |
| 6,116,732 A | 9/2000 | Xiao |
| 6,132,040 A | 10/2000 | Xiao |
| 6,139,141 A | 10/2000 | Zider |
| 6,139,142 A | 10/2000 | Zelman |
| 6,142,942 A | 11/2000 | Clark |
| 6,149,269 A | 11/2000 | Madison |
| 6,164,774 A | 12/2000 | Cate |
| 6,168,273 B1 | 1/2001 | Dupraz et al. |
| 6,170,948 B1 | 1/2001 | Chao |
| 6,170,949 B1 | 1/2001 | Mauch |
| 6,206,519 B1 | 3/2001 | Lin |
| 6,210,003 B1 | 4/2001 | Chan |
| 6,217,170 B1 | 4/2001 | Hsiao |
| 6,331,057 B1 | 12/2001 | Strube |
| RE37,545 E | 2/2002 | Chao |
| 6,343,858 B1 | 2/2002 | Zelman |
| 6,367,126 B1 | 4/2002 | Rivkin |
| 6,375,324 B2 | 4/2002 | Schleger et al. |
| 6,425,664 B1 | 7/2002 | Liu et al. |
| 6,448,372 B2 | 9/2002 | Kobayashi et al. |
| 6,450,637 B1 | 9/2002 | Zelman |
| 6,505,932 B2 | 1/2003 | Xiao |
| 6,568,805 B1 | 5/2003 | Dietz |

FOREIGN PATENT DOCUMENTS

| | | |
|---|---|---|
| EP | 0385002 | 9/1990 |
| JP | 53-124455 | 10/1978 |
| JP | 54-21357 | 2/1979 |
| JP | 9-33865 | 2/1997 |
| JP | 11-064804 | 3/1999 |
| JP | U3097213 | 8/2003 |

\* cited by examiner

MULTIPLE PIECE EYEGLASSES TEMPLE TIP

CROSS REFERENCE TO RELATED APPLICATIONS

This application claims priority to U.S. application Ser. No. 60/567,853 filed May 4, 2004.

TECHNICAL FIELD

The present invention relates to improved eyeglasses, more particularly to multiple piece temple tips that are attached to the ends of temple bars that extend from the two ends of the frame body of eyeglasses.

BACKGROUND OF THE INVENTION

Typical eyeglasses comprise a frame body that houses two lenses on either side of a nose piece. Attached to the frame body are two temple bars that extend from two ends of the frame body. The temple bars typically pivot between an open position perpendicular with the frame body and a closed position parallel with the frame body. Sometimes attached to the temple bars are separate ear pieces, or temple tips. The temple bars and nose piece support the frame on the head of the wearer.

Temple tips used for eyeglasses are single-piece units that typically slide on or are otherwise attached to the ends of the temple bars. The temple tips are typically used to provide comfort to the wearer as well as possibly add a certain amount of "grip" to help keep the eyeglasses from falling off when in use.

Wearers will sometimes attach other items to the temple bars in addition to temple tips. For example, necklaces or loops that allow the eyeglasses to be work around the user's neck when not in use have loops or other means of attaching the ends of the necklace to the temple bars. There are also some eyeglasses that attach biomagnets to the temple bars by sliding them over the temple bars. Another example is eyeglasses that have magnets slid onto the temple bars that attract when the temple bars are folded closed to grip clothing material between the temple bars and keep the eyeglasses from sliding loose. In addition, cosmetic pieces, such as real or fake jewelry may be slid on the temple bars.

BRIEF DESCRIPTION OF THE DRAWINGS

For a more detailed description of the embodiments, reference will now be made to the following accompanying drawings.

DETAILED DESCRIPTION OF THE INVENTION

Figure 1:
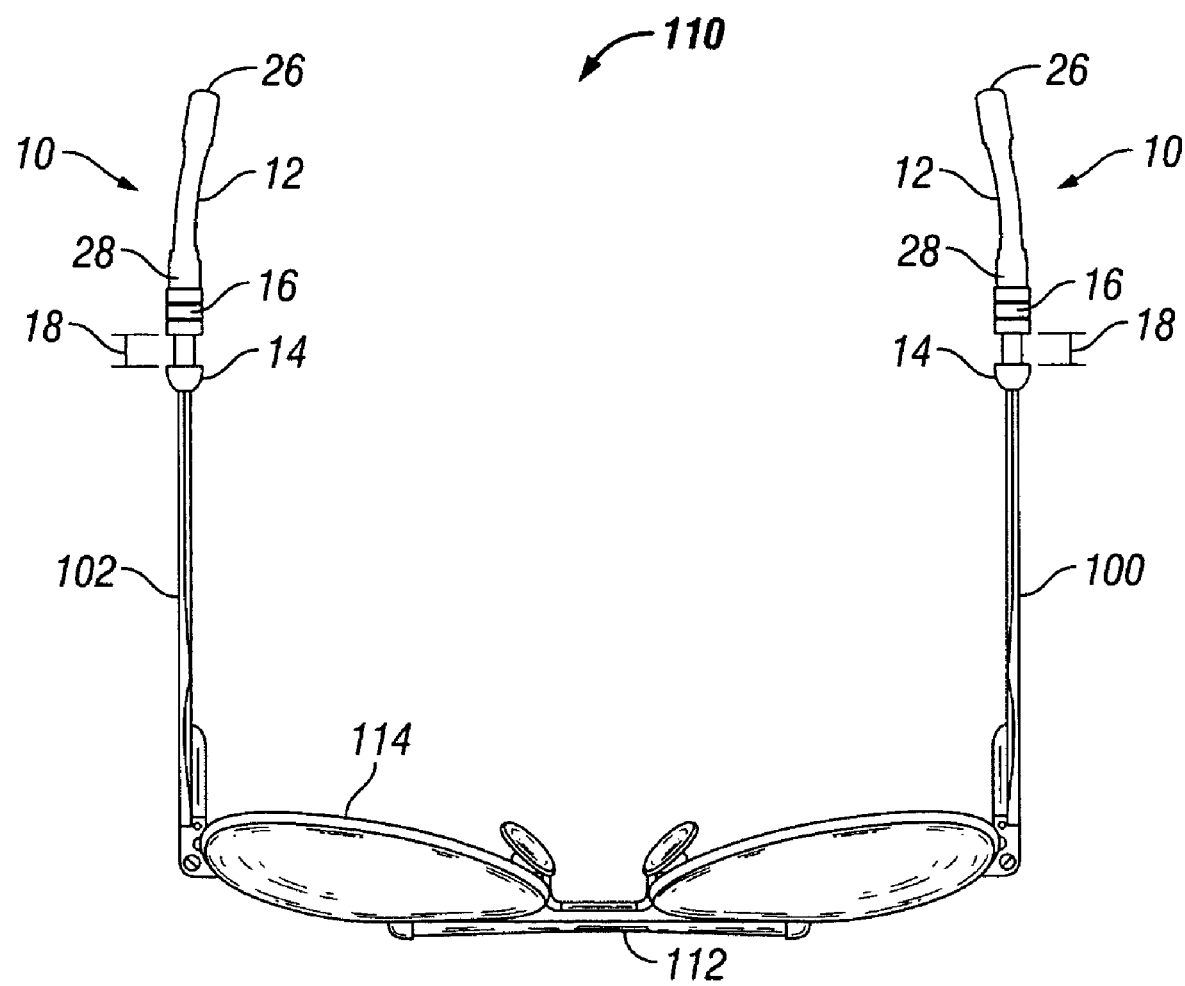
FIG. 1 is a bottom view of eyeglasses incorporating multiple piece temple tips.
Figure 2:
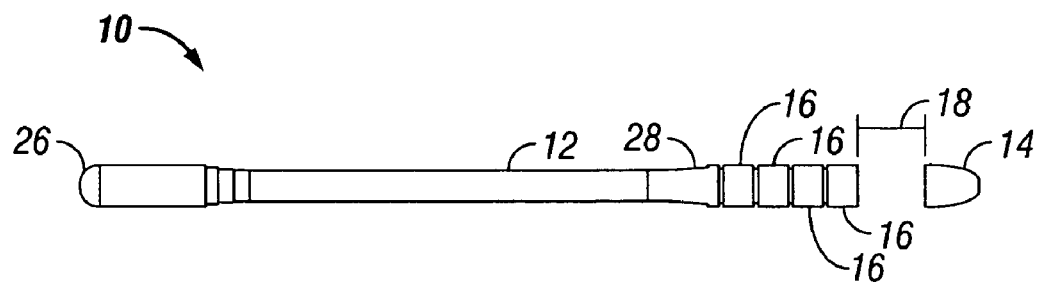
FIG. 2 is a side view of the multiple piece temple tip as illustrated in FIG. 1.

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to the illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

FIGS. 1–4 illustrate a multiple piece temple tip 10 that may be attached to eyeglasses 110. The eyeglasses 110 comprise a right temple bar 100 and a left temple bar 102 that are pivotally attached to an eyeglasses frame body 114 by any suitable means. Typically, the temple bars 100, 102 are pivotally attached by spring action hinges well known in the art. The temple bars 100, 102 pivot between an open position and a closed position. In addition the temple bars 100, 102 each comprise the multiple piece temple tip 10. The frame body 114 also may comprise a nose piece 112.

Figure 3:
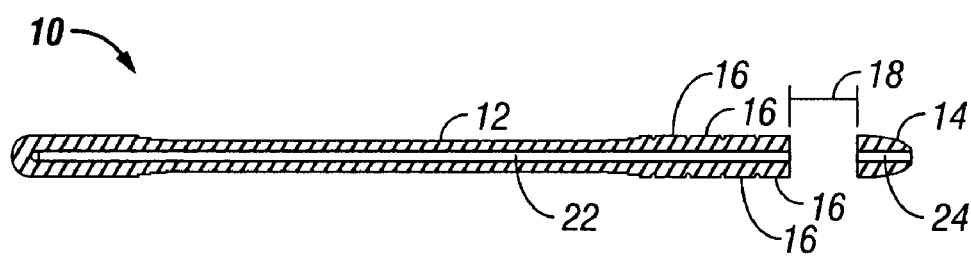
FIG. 3 is a cross-sectional side view of the multiple piece temple tip as illustrated in FIG. 1.

Each multiple piece temple tip 10 comprises a temple tip body 12 and a temple stop 14. As shown in FIG. 3, both the temple tip body 12 and the temple stop 14 are hollow and may slide on the temple bars 100, 102. The temple tip 10 may be formed of plastic, rubber or some other suitable material, preferably a material that is pliable so that it can bend to conform to the size and shape of the temples of the wearer's eyewear. The temple tip body 12 and temple stop 14 include a longitudinally extending channel 22 and 24 respectively, extending therethrough, which receives the temple bars 100, 102 of the eyeglasses. The temple tip body 12 has a first end 26 and a second end 28, and preferably the first end 26 is closed.

Figure 4:
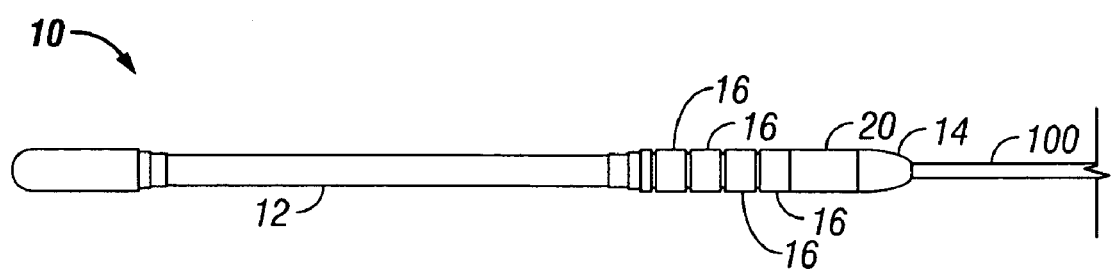
FIG. 4 is a side view of an eye glasses temple bar comprising the multiple piece temple tip illustrated in FIG. 1 attaching a magnet to the temple bar.

To install, the temple stop 14 is first inserted a distance onto the temple bar 100, 102 and then the second end 28 of the temple tip body 12 is inserted onto the temple bar 100, 102 such that the tip body 12 covers an end portion of the temple bar 100, 102. The temple tip body 12 and the temple stop 14 may be separated by a space 18 on the temple bars 100, 102. Spacing the temple tip body 12 and the temple stop 14 allows the temple tip 10 to secure an item to the temple bar 100, 102. For example as shown in FIG. 4, the temple tip body 12 and the temple stop 14 may be placed on either side of a magnet 20 that is slid onto the temple bar 100. The temple tip body 12 and temple stop 14 may be secure enough to hold the magnet 20 in place. The temple tip body 12 and temple stop 14 may be secured to the temple bar 100, 102 either by friction, or by any other suitable means, such as adhesive bonding. The temple tip body 12 may also be removed from the temple bar 100, 102 to remove the object being secured to the temple bar 100, 102. As additional examples, jewelry and eyeglasses necklace loops may also be secured between the temple tip body 12 and the temple stop 14.

The temple body 12 may alternatively further comprise a plurality of rib portions 16 positioned at the second end 28 of the tip body 12, facing the temple stop 14. Separating each rib portion 16 is an area 30 of reduced diameter of the temple tip body 12. The rib portions 16 allow the length of the temple tip body 12 to be easily adjusted by severing as many rib portions 16 from the temple tip body 12 as desired.

The areas 30 of reduced diameter between the rib portions 16 provide a guide for easily and cleanly cutting the desired rib portions 16 from the temple tip body 12. The number and/or the width of the rib portions 16 may vary depending on the desired length of the temple tip body 12, preferably there are at least two rib portions 16 on a tip body 12.

Figure 5:
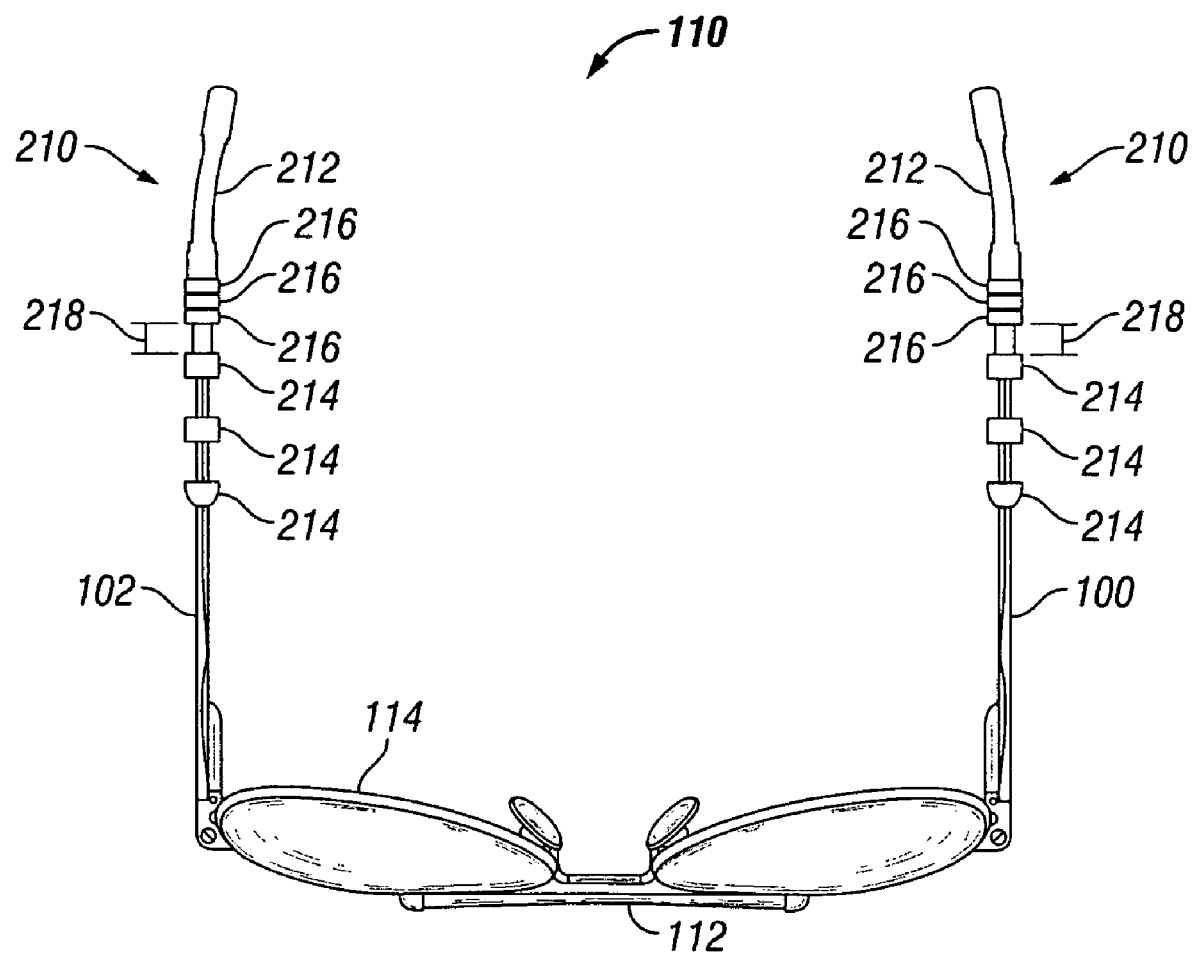
FIG. 5. is a bottom view of eyeglasses incorporating another embodiment of multiple piece temple tips.

FIG. 5 illustrates a second embodiment of a multiple piece temple tip 210. The multiple piece temple tip 210 also comprises a temple tip body 212 as illustrated and discussed above. The multiple piece temple tip 210, however, may comprise more than one temple stop 214. The multiple piece temple tip 210 allows for more than one item to be secured to the temple bar 100, 102 with each multiple piece temple tip 210. By way of non-limiting example, more than one magnet or more than one piece of jewelry may be slid onto and secured to the temple bar 100, 102. The number of temple stops 214 may vary depending on the number of items that are secured to the temple bar 100, 102. Additionally, the temple stops 214 need not be all the same width if specific spacing of the items along the temple bar 100, 102 is desired.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A multiple piece temple tip for eyeglasses, the eyeglasses having a right temple bar and a left temple bar pivotally attached to an eyeglasses frame body, the temple tip comprising:
   a temple tip body having a first and second end and a longitudinal channel extending therethrough;
   at least one temple stop having a longitudinal channel extending therethrough;
   wherein the temple tip body and stop are formed from a pliable material;
   wherein the temple tip body and stop are designed for inserting onto any one of the temple bars; and
   wherein the temple tip body and stop function to secure at least one item to any one of the temple bars between the stop and the tip body.

2. The multiple piece temple tip of claim 1, further comprising a plurality of rib portions positioned at the second end of the tip body, wherein each rib portion is separated by an area of a reduced diameter of the tip body.

3. The multiple piece temple tip of claim 1, wherein the pliable material can be plastic or rubber.

4. The multiple piece temple tip of claim 1, wherein the temple tip includes a temple tip body and at least two temple stops.

5. A method of installing the multiple piece temple tips on eyeglasses, the method comprising the steps of:
   providing eyeglasses having a right temple bar and a left temple bar pivotally attached to an eyeglasses frame body;
   inserting a temple stop a distance onto each of the temple bars;
   inserting an end of a temple tip body onto each of the temple bars;
   providing a space between the temple stop and the temple tip body such that at least one item may be secured to the temple bars between the stop and the tip body.

6. The method of claim 5, wherein the at least one item secured to the temple bars is a magnet.

7. The method of claim 5, further comprising the step of inserting a plurality of temple stops a spaced distance onto each of the temple bars prior to inserting the temple tip body.

* * * * *